UNITED STATES PATENT OFFICE.

OTTO FISCHER, OF MUNICH, ASSIGNOR TO FARBWERKE, VORMALS MEISTER, LUCIUS & BRÜNING, OF HÖCHST-ON-THE-MAIN, GERMANY.

PROCESS OF PREPARING OXYHYDRO-ETHYL CHINOLINE.

SPECIFICATION forming part of Letters Patent No. 273,498, dated March 6, 1883.

Application filed September 26, 1882. (Specimens.)

*To all whom it may concern:*

Be it known that I, OTTO FISCHER, doctor of philosophy, and a citizen of the Empire of Germany, residing at Munich, Germany, have invented certain new and useful Improvements in the Preparation of Oxyhydro-Ethyl Chinoline, of which the following is a specification.

My invention consists in the preparation of oxyhydro-ethyl chinoline from chinoline.

It is a fact well known that the basic oils from coal-tar contains, besides other bases, chinoline and its homologues, which may be separated by fractional distillation, treatment with weak oxidizing agents, or by other suitable methods. It is, however, chinoline which is of interest to me. From this base I have obtained by a series of operations new compounds which I find to be valuable medical agents.

The following is a description of my method of proceeding: My process begins with pure chinoline sulpho-acid, which manufacture is not herein set forth or claimed. I convert the chinoline into the monosulphonic acids by the method employed by Lubowin, (Berichte der Deutschen Chemischen Gesellschaft zu Berlin, 1869, p. 400,)—*i. e.*, by heating it with fuming sulphuric acid to about 212° Fahrenheit, (100° centigrade.) The mass resulting from the reaction I treat with lime, remove the calcium sulphate formed, and convert the calcium salts of chinoline sulphonic acids contained in the solution into the sodium salts by adding the calculated amount of carbonate-of-soda solution. The carbonate of lime which has been precipitated I filter off, and evaporate the filtrate to dryness. In order to obtain oxychinoline from the sodium salts constituting the residue, I heat it with from two to three times its quantity of caustic soda and a little water, until the sodium compound of oxychinoline shows itself on the surface of the melt in form of a brown oil. I now allow the melt to cool, dissolve it in water, and exactly neutralize the solution with hydrochloric acid. Oxychinoline now separates in a crystalline form, and may be purified by distilling it in a current of steam.

I must here observe that in sulphonizing chinoline two isomeric sulphonic acids are formed. They may be separated from each other by crystallizing from water. One of them, which I designate as "alphachinoline sulphonic acid," forms compact crystals, whereas the other, the betachinoline sulphonic acid, crystallizes in prisms. Their behavior on being submitted to the operations indicated in this application is the same. The alphaoxy-chinoline crystallizes in fine achromatic needles, melting at 167.8° to 168.8° Fahrenheit, (120° to 122° centigrade.) It is identical with the chinophenal described by Weidel and Cobenzl, (Wiener Monatsh, 1880, p. 862.) The betaoxy-chinoline also crystallizes in achromatic needles, but its melting-point is 446° Fahrenheit, (230° centigrade.) On heating these oxychinolines with tin and hydrochloric acid upon the water bath for several hours, they take up four atoms of hydrogen and change into oxyhydro-chinolines. After having precipitated the tin from the diluted solution with sulphureted hydrogen, the oxyhydro-chinolines are separated by exactly neutralizing the filtered liquid with soda solution. After being washed with water the oxyhydro-chinolines are crystallized from benzole or ether. The alphaoxyhydro-chinoline forms beautiful crystals, melting at 148.8° to 151.6° Fahrenheit, (121° to 122° centigrade.) The betaoxyhydro-chinoline crystallizes in small scales or long needles. Both these compounds are distinguished from the oxychinolines by not being volatile with water-steam. When the isomeric oxyhydro-chinolines are treated with methyl or ethyl iodide they yield new compounds according to the following equations:

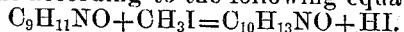
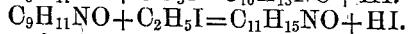

$$C_9H_{11}NO + CH_3I = C_{10}H_{13}NO + HI.$$
$$C_9H_{11}NO + C_2H_5I = C_{11}H_{15}NO + HI.$$

(alpha or beta oxyhydro-chinoline) + (methyl or ethyl iodide) = (hydroiodide of oxyhydro methyl or ethyl chinoline.) When it is intended to produce, for instance, the alphaoxyhydro-ethyl chinoline, the proceeding is the following: One molecule of alphaoxyhydro-chinoline is heated upon the water bath with one molecule of ethyliodide until the reaction, which is violent at first, has come to a standstill. From the crystalline mass obtained on cooling the hydroiodide of oxyhydro-ethyl chinoline is extracted by means of water, and the new base itself is precipitated from the aqueous solution of the salt by means of caustic soda. It is afterward purified by crystallization from ether.

For use the base is transformed into the respective salt by means of hydrochloric, sulphuric, or another acid.

As it is my intention to immediately file another application and claim for oxyhydromethyl chinoline, alluded to in this application, I respectfully request that nothing in this case may serve to intefere with said new application.

What I claim as new, and wish to secure by Letters Patent, is—

1. The process of manufacturing oxyhydroethyl chinoline from pure chinoline for medical and other use, which consists in first converting the same into oxychinoline by the well-known process, then producing oxyhydro chinoline by treating the oxychinoline with tin and hydrochloric acid, then converting the oxyhydro-chinoline into oxyhydro-ethyl chinoline by treatment of the isomeric oxyhydro-chinolines with ethyliodide by heat in a water bath, and after the reaction the extracting of oxyhydroethyl chinoline by means of water, and precipitating said base by means of caustic soda.

2. Oxyhydro-ethyl chinoline prepared by the process herein described or by any other means that will produce a like result.

In testimony whereof I affix my signature in presence of two witnesses.

OTTO FISCHER. [L. S.]

Witnesses:
EMIL HENZEL,
JOSEPH W. HARPER.